US008150484B2

(12) United States Patent
Laurent et al.

(10) Patent No.: US 8,150,484 B2
(45) Date of Patent: Apr. 3, 2012

(54) PROTECTIVE HOUSINGS FOR WIRELESS TRANSMISSION APPARATUS AND ASSOCIATED METHODS

(75) Inventors: Kris Laurent, London (GB); Stuart Williams, Hampshire (GB); Caroline Millar, Bramley (GB)

(73) Assignee: Nokia Corporation, Espoo (FI)

( * ) Notice: Subject to any disclaimer, the term of this patent is extended or adjusted under 35 U.S.C. 154(b) by 1182 days.

(21) Appl. No.: 11/853,715

(22) Filed: Sep. 11, 2007

(65) Prior Publication Data

US 2009/0069061 A1 Mar. 12, 2009

(51) Int. Cl.
*H04M 1/00* (2006.01)

(52) U.S. Cl. ............... 455/575.7; 455/575.8; 455/575.5; 455/550.1; 455/90.2; 455/90.3

(58) Field of Classification Search ........................ None
See application file for complete search history.

(56) References Cited

U.S. PATENT DOCUMENTS 5,493,704 A * 2/1996 Grangeat et al. ........... 455/575.5
6,359,213 B1 * 3/2002 Long ............................ 174/388
7,046,203 B2 * 5/2006 Yuanzhu .................... 343/7 MS
7,218,227 B2 * 5/2007 Davis et al. ................ 340/572.1
2003/0011530 A1 1/2003 Lin
2003/0076262 A1 * 4/2003 Forrester et al. ........... 343/7 MS
2004/0198264 A1 10/2004 Saur et al.
2005/0020214 A1 * 1/2005 Neill et al. ...................... 455/73
2005/0024275 A1 * 2/2005 Jo et al. ......................... 343/702
2008/0258990 A1 * 10/2008 Burrell et al. ................. 343/835

FOREIGN PATENT DOCUMENTS

GB 2 363 909 A 1/2002
WO WO 2005/004277 1/2005

OTHER PUBLICATIONS

Harry Newton, “Antenna”; “CDMA2000”; “Dual Band”; “Wireless Digital Standards”, Newton’s Telecom Dictionary, Mar. 2007, Flatiron Publishing, 23rd ed., pp. 114, 218, 337, 1017.*
International Search Report for PCT Application No. PCT/EP2008/007290.

* cited by examiner

*Primary Examiner* — Willie J Daniel, Jr.
(74) *Attorney, Agent, or Firm* — Harrington & Smith

(57) ABSTRACT

A housing for an apparatus for portable wireless transmission, the apparatus for portable wireless transmission having an antenna element arranged to be able to resonate at a particular highest resonant operating frequency to send/receive transmissions substantially in a significant radiating direction. The housing comprises one or more metal piece areas arranged to, when assembled with the apparatus for the portable wireless transmission, be located over the antenna element in a significant radiating direction in electrical isolation from an electrical ground of the apparatus. The metal piece area(s) comprise a plurality of metal pieces arranged with the housing to be substantially electrically isolated from surrounding metal with dimensions having effective lengths of at most five-tenths of a wavelength for the highest resonating operating frequency of the antenna element.

34 Claims, 3 Drawing Sheets

PROTECTIVE HOUSINGS FOR WIRELESS TRANSMISSION APPARATUS AND ASSOCIATED METHODS

FIELD OF THE INVENTION

The present invention relates generally to the use of (bulk) metal pieces in/on a (e.g. protective/decorative) housing for a (hand) portable electronic apparatus, the apparatus being arranged to provide one or more wireless transmission (send/receive over an air interface) functions using one or more respective antenna elements. In particular, the present invention relates to the use of metal pieces over antenna element regions without significantly impacting the ability of the antenna element to operate effectively at its resonant operating frequency/frequencies.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In certain apparatus, the sensitive electronic components/circuitry of a portable electronic apparatus is/are protected by using an exterior protective housing. Such housings provide physical protection against damage, for example from physical forces (e.g. impact) and/or the ingress of liquid. Housings may also/alternatively be used to provide a decorative (user interface) surface for the electronic components/circuitry of the apparatus. Examples of such housings are the so-called A/B/C covers of mobile phones. Although such housings provide the exterior face of the phones, the present invention is not necessarily limited to exterior housings for wireless transmission apparatus, but may be applied to interior housings for wireless transmission apparatus.

The use of metal in housings for mobile phones has been limited due to the inherent nature of metal which can provide a negative shielding effect which would significantly impact the ability of the antenna element to operate effectively at its resonant operating frequency.

Therefore, some forms of metal have been applied to mobile phone housings. For example, metallised paint (e.g. metal flakes in a polymer matrix) has been used to provide the appearance of metal on housings, rather than a true metal housing. Such paints are easily removed by abrasion, particularly at corners. Very thin layers of metal have also been applied using vacuum techniques (e.g. Physical Vapour Deposition (PVD), sputtering, Evaporation Vacuum Metallisation (EVM), Electron Beam-VM (EB-VM)). Again, these metal layers provide very low wear resistance properties, and need to be protected using a transparent protective film. Typically, such applied thin layers are of the order of nanometres or up to (low) tens of micrometres (e.g. 25 microns) or less.

In certain mobile phones, solid (thick) metal covers have been used (e.g. some Vertu™ products). However, regions over the antenna element (in the antenna "significant" radiating direction) have not been covered by metal so that the antenna element may operate effectively. In such regions, plastic/leather, and not metal, has been used over the antenna element areas. Furthermore, in such cases, the metal of/on the housing has been electronically grounded to the ground of the Printed Wiring Board (PWB) of the apparatus.

With regard to the aforementioned "significant radiating direction", it will be appreciated that antenna elements have front/back radiating faces, and corresponding radiating directions, over which substantially a significant percentage (of the order of 50% or more) of the wireless transmissions are sent/received. It will also be appreciated that the antenna elements have other less significant radiating directions.

U.S. Pat. No. 5,338,617 describes a communications apparatus comprising a receiving antenna, a transmitting antenna and a shield separating said receiving antenna from electromagnetic energy radiated from said transmitting antenna, said shield comprising insulated metal particles, wherein said insulated metal particles include an insulating coating; and a plastic matrix including said insulated metal particles.

U.S. Pat. No. 6,498,292 describes an electrical unit the unit is a mobile telephone comprising two shield parts: a first part and the second part that have a reinforced electrically conductive layer adapted to prevent moisture from reaching the at least one of the first part and the second part, the reinforced electrically conductive layer comprises coarse metal particles in a binder and the binder is selected from the group consisting of acrylic, PVC, and resin.

The listing or discussion of a prior-published document in this specification should not necessarily be taken as an acknowledgement that the document is part of the state of the art or is common general knowledge. One or more aspects/embodiments of the present invention may or may not address one or more of the background issues.

SUMMARY OF THE INVENTION

In a first aspect, there is provided a housing for an apparatus for portable wireless transmission, the apparatus for portable wireless transmission having an antenna element arranged to be able to resonate at a particular highest resonant operating frequency to send/receive transmissions substantially in a significant radiating direction, the housing comprising one or more metal piece areas arranged to, when assembled with the apparatus for the portable wireless transmission, be located over the antenna element in a significant radiating direction in electrical isolation from an electrical ground of the apparatus, and wherein the metal piece area(s) comprise a plurality of metal pieces arranged with the housing to be substantially electrically isolated from surrounding metal, with dimensions having effective lengths of at most five-tenths of a wavelength for the highest resonating operating frequency of the antenna element.

In certain embodiments, the maximum effective length for the dimensions may be 9/20, four-tenths, 7/20, three-tenths, 5/20, two-tenths, 3/20 or one-tenth of the wavelength.

Although the metal piece areas are in a significant radiating direction, the arrangement of the metal piece(s) in the metal piece area(s) allows the antenna element to radiate "through" the metal piece area (in certain embodiments as if the metal piece(s) in the area was/were (almost) not there)—a "radio transparent cover". In certain embodiments, the metal piece area(s) allow the antenna element to operate substantially independently of the metal piece area(s).

The surrounding metal may be other metal pieces of the housing and/or metal, which, when the housing is assembled with the apparatus for portable wireless transmission, is adjacent to the metal piece(s)/metal piece areas.

It will be appreciated that the thickness dimension extends substantially parallel with respect to a significant radiating direction. The particular thickness used would depend on the practical circumstances (maximum thickness being dependent on degradation on performance and minimum thickness being dependent on limitations of manufacture). In certain embodiments, the minimum thickness may be of the order of 20, 30, 40 or 50 microns or more. In other embodiments, the minimum thickness may be of the order of 100 microns. The other (i.e. non-thickness) dimensions (e.g. length, width, diameter) extend substantially perpendicularly to a significant radiating direction. As an example, the other dimension may be a diameter of a circular metal piece, or length and width of a rectangular metal piece. Again, the particular dimension used would depend on degradation on performance and practical manufacturing limitations.

One or more metal pieces may be arranged to be isolated from other metal/metal pieces such that each isolated metal piece has dimensions having effective lengths of at most one-tenth of a wavelength for the highest resonating operating frequency of the antenna element. However, one or more metal pieces may be touching (purposefully joined by metal or as an inherent result of the manufacturing process of the housing) to provide dimensions having effective (i.e. combined) lengths for the particular (combined) touching metal of at most one-tenth of a wavelength for the highest resonating operating frequency of the antenna element.

In the case of an antenna element with a single resonant operating frequency, the highest operating resonant frequency is the single resonant operating frequency. In the case of a dual-band resonant antenna element, the highest resonant operating frequency is the higher of the two resonant operating frequencies. Similarly, in the case of a multi-band antenna element, the highest resonant operating frequency is the highest of the multiple resonant operating frequencies.

A particular metal piece area may be formed from a single metal piece or a plurality of discrete metal pieces. The plurality of metal pieces may be located proximal to one another with gaps of the order of 1 mm between them. The gaps may be of the order of 0.1 mm or greater.

The thickness of a particular metal piece is sufficient such that it can not be readily scraped away from the housing. One or more metal pieces may have a maximum thickness of up to around 2 mm in a significant radiating direction. One or more metal pieces may have a dimension (e.g. length/width/diameter) perpendicular to a significant radiating direction of the order of a few millimetres (up to around one tenth of a wavelength at the highest operating frequency).

One or more metal pieces or metal piece areas may be formed from metal having an irregular shape and/or regular (e.g. circular, ellipse, square, rectangular, triangle, trapezium etc) shape. One or more metal pieces or metal piece areas may be formed from metal having the shape of a symbol such as an alphanumeric character, or graphical icon.

One or more metal pieces may be arranged to have substantially a flat (and/or smooth) surface extending perpendicular to a significant radiating direction (e.g. which would be presented to a user in use). One or more metal pieces may be arranged to have substantially a non-flat (e.g. comprising curves and/or blunt points) surface (and/or non-smooth surface i.e. rough) extending perpendicular to a significant radiating direction (e.g. which would be presented to a user in use).

One or more metal pieces may comprise a precious metal, such as gold, silver, or platinum. One or more metal pieces may be a non-precious metal, such as copper, aluminium, titanium, or (e.g. stainless) steel. One or more metal pieces may be made from a metal alloy.

The one or more metal pieces areas may be formed from the same type of metal piece or different types of metal pieces e.g. some of the metal pieces may be gold and some other pieces platinum. The metal piece area may provide a regular/irregular matrix of substantially non-connected metal piece. The metal piece area may be arranged to provide a decorative pattern on the housing.

The housing may provide an interior/exterior housing for the apparatus.

The one or more metal piece areas may be formed substantially from a continuous metal sheet. Rather than applying the metal by a coating process (e.g. painting/PVD/sputtering etc), the metal may be applied using a gluing process.

One or more of the metal pieces may be formed (e.g. shaped, sized, finished) using one or more of chemical etching, electroforming, stamping, extruding, grinding, and/or polishing processes. One or more metal piece areas may be formed on a substrate layer. The substrate layer may be formed from a non-conductive material (e.g. plastic).

One or more metal piece area(s) may provide a layer on top of the substrate layer and/or be substantially embedded within the substrate layer (but still visible).

One or more metal pieces may be applied to a substrate by one or more mechanical methods (e.g. riveting, soldering, and/or screwing) and/or chemical methods (e.g. gluing).

One or more metal pieces may be formed on a substrate layer during a (in-moulding/over-moulding) moulding process to form the housing.

The metal piece area(s) may substantially extend over the entire face of the housing. The metal piece area(s) may comprise a protective sheet over the metal piece areas (e.g. lacquer). In this way, the metal piece area(s) may be protected by a protective sheet film and not be directly exposed to a user.

The housing may comprise a plurality of discrete metal piece areas each for a different antenna element. The housing may comprise a particular metal piece area which extends over different antenna elements areas.

The metal piece area may be formed to extend over a corner/side/edge region of the housing. The corner/side/edge region of the housing may not substantially lie in plane parallel to the resonating plane of the antenna element (i.e. may extend parallel to the radiating direction of the antenna element). One or more sections of the metal piece area may extend in a plane substantially perpendicular to the resonating plane of the antenna element.

The antenna element may be arranged to operate at a number of operating resonant frequencies (e.g. it may be a dual-band/tri-band/multi-band antenna element).

The antenna element(s) may be arranged for near field wireless communication (e.g. Radio Frequency Identification, RFID) and/or far field wireless communication (e.g. Bluetooth™, Wireless Local Area Network (WLAN), 2G/3G/4G, and/or satellite telephony/location (e.g. GPS/Galileo) communication).

The housing may be a front or rear housing of the apparatus, which may be a user-removable cover.

In accordance with a second aspect, there is provided a combination of a housing for an apparatus for portable wireless transmission and an apparatus for portable wireless transmission, the apparatus for portable wireless transmission having an antenna element arranged to be able to resonate at a particular highest resonant operating frequency to send/receive transmissions substantially in a significant radiating direction, the housing comprising one or more metal piece areas arranged to, when assembled with the apparatus for the portable wireless transmission, be located over the antenna element in a significant radiating direction in electrical isolation from an electrical ground of the apparatus, and wherein the metal piece area(s) comprise a plurality of metal pieces arranged with the housing to be substantially electrically isolated from surrounding metal with dimensions having effective lengths of at most five-tenths of a wavelength for the highest resonating operating frequency of the antenna element.

In accordance with a third aspect, there is provided a method of manufacturing a housing, comprising forming a housing for an apparatus for portable wireless transmission, the apparatus for portable wireless transmission having an antenna element arranged to be able to resonate at a particular highest resonant operating frequency to send/receive transmissions substantially in a significant radiating direction, the housing comprising one or more metal piece areas arranged to, when assembled with the apparatus for the portable wireless transmission, be located over the antenna element in a significant radiating direction in electrical isolation from an electrical ground of the apparatus, and wherein the metal piece area(s) comprise a plurality of metal pieces arranged with the housing to be substantially electrically isolated from surrounding metal with dimensions having effective lengths of at most five-tenths of a wavelength for the highest resonating operating frequency of the antenna element.

In accordance with a fourth aspect, there is provided a means for housing for a means for portable wireless transmission, the means for portable wireless transmission having a means for resonating arranged to be able to resonate at a particular highest resonant operating frequency to send/receive transmissions substantially in a significant radiating direction, the means for housing comprising one or more metal piece areas arranged to, when assembled with the means for portable wireless transmission, be located over the means for radiating in a significant radiating direction in electrical isolation from an electrical ground of the means for portable wireless transmission, and wherein the metal piece area(s) comprise a plurality of metal pieces arranged with the means for housing to be substantially electrically isolated from surrounding metal with dimensions having effective lengths of at most five-tenths of a wavelength for the highest resonating operating frequency of the means for resonating.

In accordance with a fifth aspect, there is provided a combination of a means for housing for a means for portable wireless transmission and a means for portable wireless transmission, the means for portable wireless transmission having a means for resonating arranged to be able to resonate at a particular highest resonant operating frequency to send/receive transmissions substantially in a significant radiating direction, the means for housing comprising one or more metal piece areas arranged to, when assembled with the means for portable wireless transmission, be located over the means for radiating in a significant radiating direction in electrical isolation from an electrical ground of the means for portable wireless transmission, and wherein the metal piece area(s) comprise a plurality of metal pieces arranged with the means for housing to be substantially electrically isolated from surrounding metal with dimensions having effective lengths of at most five-tenths of a wavelength for the highest resonating operating frequency of the means for resonating.

In a further aspect, there is provided a housing for an apparatus for portable wireless transmission, the apparatus for portable wireless transmission having an antenna element arranged to be able to resonate at a particular highest resonant operating frequency to send/receive transmissions substantially in a significant radiating direction, the housing comprising one or more metal piece areas arranged to, when assembled with the apparatus for the portable wireless transmission, be located over the antenna element in a significant radiating direction in electrical isolation from an electrical ground of the apparatus, and wherein the metal piece area(s) comprise one or more metal piece(s) arranged with the housing to be substantially electrically isolated from surrounding metal, with dimensions having effective lengths of at most five-tenths of a wavelength for the highest resonating operating frequency of the antenna element.

The present invention includes one or more aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

A description is now given, by way of example only, with reference to the accompanying drawings, in which:

FIG. 4(*d*) shows a partial view of two metal tiles connected by narrow lines.

DETAILED DESCRIPTION OF VARIOUS EMBODIMENTS

The hand-portable electronic apparatus of various embodiments the present invention are readily hand-portable, and may be so-called “mobile” devices such as a “mobile phone”. The apparatus may or may not be hand-held in use, and may or may not provide additional functions over and above the wireless transmission function(s). Such additional functions may include the provision of audio/video input/output (e.g. playing/recording of audio and video).

Wireless transmission functions may include audio/video telephony and/or non-telephony wireless transmission functions. The antenna element(s) may be for near field wireless communication (e.g. Radio Frequency Identification, RFID) and/or far field wireless communication (e.g. Bluetooth™, Wireless Local Area Network (WLAN), 2G (e.g. GSM, TDMA), 2.5G, 3G (e.g. WCDMA), 4G, and/or satellite telephony/location (e.g. GPS/Galileo) communication) or relate to one or more wireless transmission standards.

In certain embodiments, the housing may be a user-removable cover, which may be user-removable by hand without the aid of any tools. However, in other embodiments, the housing may not be user-removable without the use of a tool, or may not be user-removable at all (e.g. without damage being caused).

For the sake of convenience, the discussions herein are focused on mobile telephones. However, the present invention is not limited to so-called “mobile phones” but extends to apparatus for wireless transmission in general, and associated protective housings.

Figure 1A:
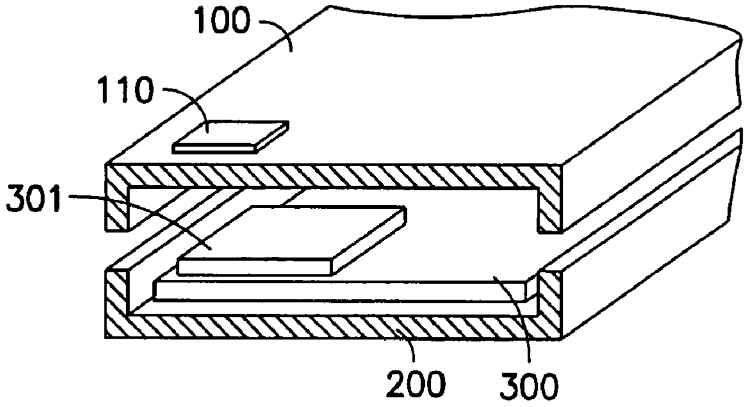
FIGS. 1(*a*) and 1(*b*) shows perspective and side views of schematic representations of an embodiment of the present invention.
Figure 1B:
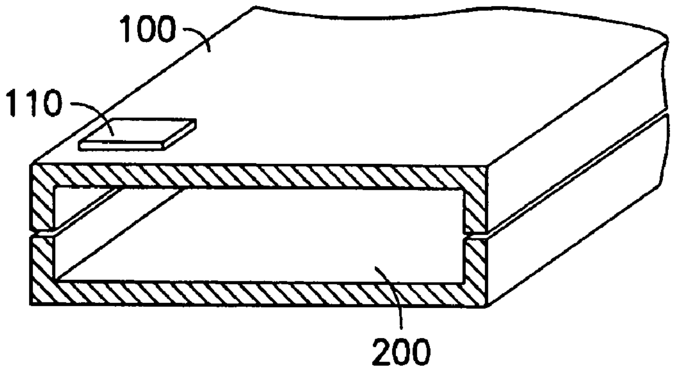

As previously mentioned, the present invention can be applied to various portable apparatus which provide wireless transmission functions, but for the sake of simplicity, embodiments will be discussed which provide wireless telephony functions. In this respect, FIG. 1 shows front 200 (so-called A cover) and rear 100 (so-called B cover) housings, and a PWB 300 comprising the electronic circuitry/components (including antenna element 301) which provide the functions of the phone. When assembled, the housings 100, 200 mate with one another and provide a sealed protective cover within which the PWB 300 is housed. In the present example, the housings are user-removable covers which are visually presented to a user of the phone.

The antenna element 301 extends in the X/Y plane, and has significant radiating directions which extend in the (plus/minus) Z direction. The housings 100, 200 provide respective surfaces in all X/Y/Z planes. It can be said that a significant percentage of the wireless transmissions are sent/received in the (plus/minus) Z direction. In the case that a phone is held against a user, the wireless transmission may be significantly directed out of the rear of the phone face. If held in-use in a hands-free mode (or when in an idle mode in a suitably arranged cradle), significant radiating directions may be both the front and rear faces of the phone.

Figure 2:
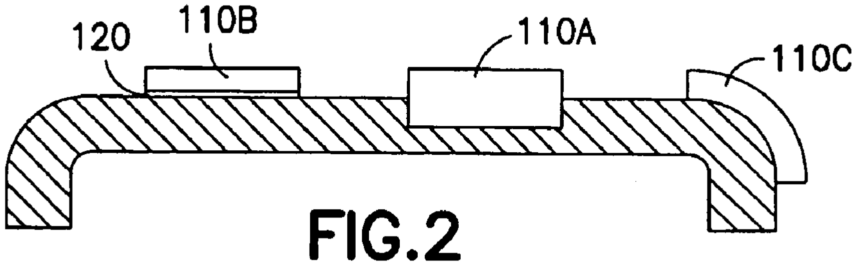
FIG. 2 illustrates test results which show the impact of metal pieces applied according to one or more embodiments of the present invention.

According to one embodiment, one or more pieces of metal 110 are applied to the housing 100 to extend in the X/Y plane across the Z direction, over the antenna element area. The size and distribution of such metal pieces are discussed below (see FIG. 4 for example), but as can be seen from FIG. 2, the one or more pieces of metal 110 can be embedded (110A) within the housing or attached (110B) using an adhesive 120. In other embodiments (not shown), the one or more pieces of metal 110 may be applied additionally or alternatively to the other housing 200. In further embodiments (not shown), the pieces of metal 110*c* are applied to corner/edge/side areas of the metal to protect such areas from impact and/or to provide a decorative finish.

Figure 3:
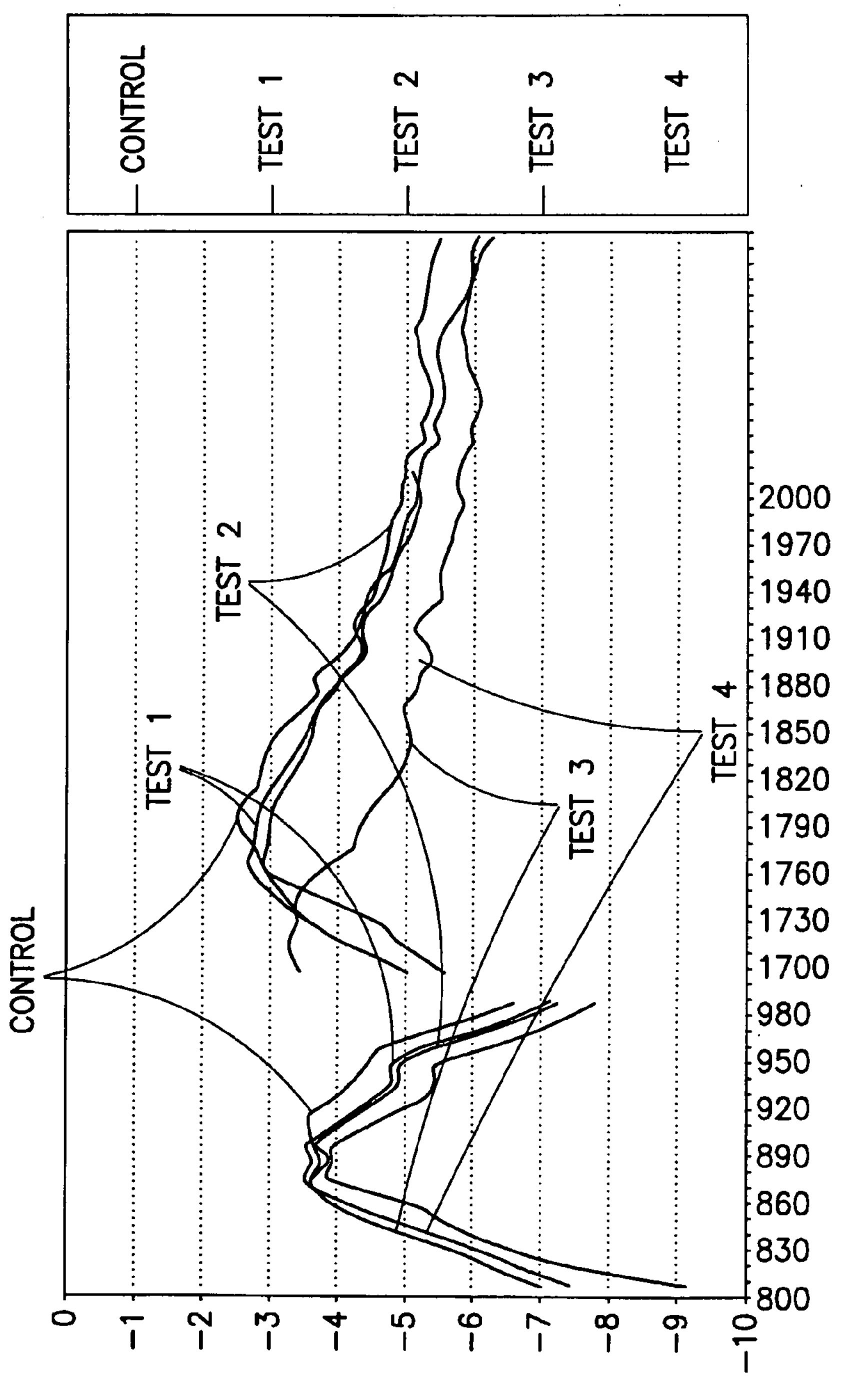
FIG. 3 illustrates the performance of a dual-band GSM antenna with different metal piece configurations.
Figure 4A:
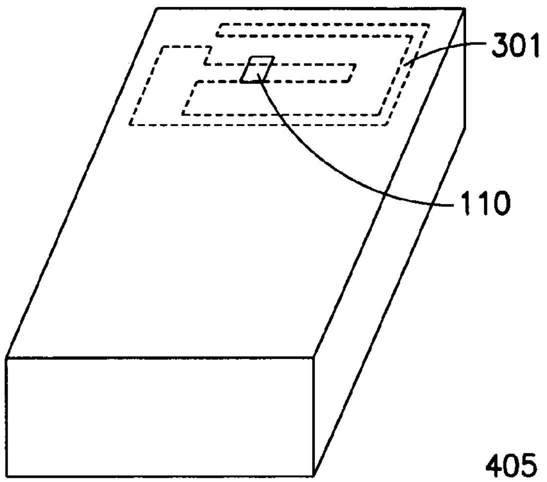
FIGS. 4(*a*), 4(*b*), and 4(*c*) show perspective representations of a number of embodiments of the present invention.
Figure 4B:
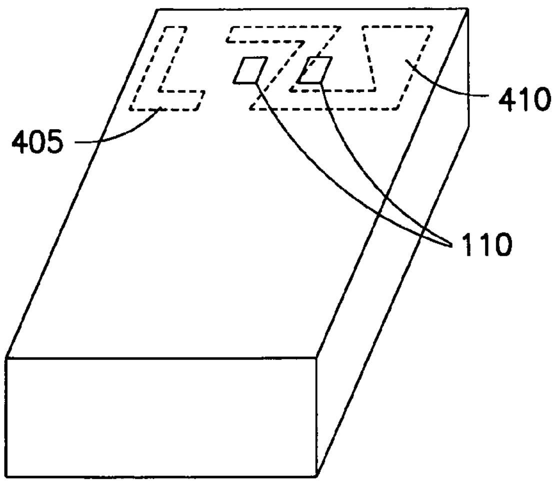
Figure 4C:
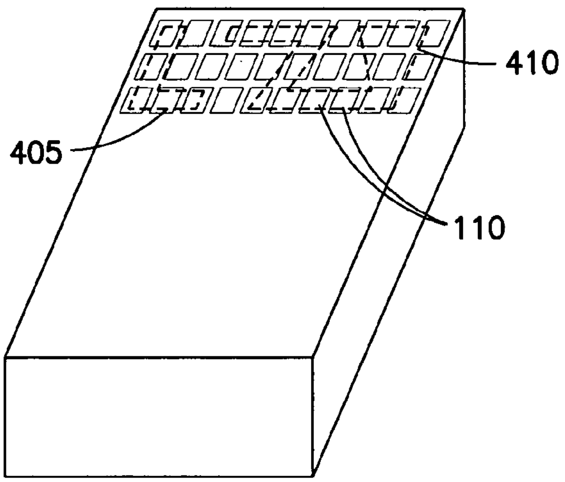
Figure 4D:

FIG. 3 shows some tests which were carried out to determine the effect of pieces of metal on antenna performance. The antenna tested was a dual-band GSM antenna. The tests have shown that small isolated metal pieces can be placed very close to an antenna so long as they are floating (i.e. not grounded to the main handset ground).

Trace Control is for an antenna with no metallic covering. Traces Test 1 and Test 2 show the effects of placing differing numbers of copper tape metal (with metal thickness of the order of 0.1 mm) over the antenna. The metal tape in question was used to provide rectangular metal regions of dimensions 5 mm×4 mm with a 1 mm gap between tiles. The metal tape extended over the whole of the surface area of the antenna element (including gaps between metal tape pieces). It can be seen that the effect on antenna performance is to shift it slightly to a lower operating frequency, but to leave the maximum radiated power at the same level.

Trace Tests 3 shows the impact of pieces of sheet metal rather than tape. Pieces of sheet metal of the same dimensions were made from 1 mm thick stainless steel sheet. When glued in place over the antenna, Test 3 shows a similar result to that produced above, with some slight differences. The tuning to a lower frequency is more marked for the thicker tiles. Also there is a slight loss in peak radiated performance, particularly for the higher frequency band of the antenna.

Finally, adjacent pieces of metal were connected together with copper tape, in order to assess the effects of larger metal tiles on antenna performance, with the results shown in Test 4. There is a slight further reduction in peak antenna gain, but this is not significant.

Thus, from these tests, it can be concluded that a metal housing could be made of shapes of isolated metal. The placing of such large amounts of metal over an antenna, with minimum effect on antenna performance, would not be expected and is surprising.

The following general principles were concluded from these experiments:

The metal pieces must be electrically small at the frequency of operation of the antenna they are covering (larger pieces of metal may be positioned over an antenna with a lower operating frequency). A maximum size of one tenth of a wavelength at the highest operating frequency is defined for minimal impact on antenna performance. Larger sizes than this can be used but may significantly degrade antenna performance.

Varying the shape of the pieces of metal is not important, only that they are isolated from each other. Squares, circles, triangles, non-geometric shapes, writing, symbols etc would all be fine. Combinations of different shapes would also be fine.

The larger the size of metal piece, the larger the effect on antenna tuning.

The thicker the metal piece the larger the reduction in peak antenna gain.

The smaller the gap between pieces, the greater the effect on antenna performance.

All or just a part of the antenna may be covered.

The particular ranges for the dimensions of the metal pieces would vary according to the particular operating frequency. However, in general, it has been found that metal pieces having thickness of 1-2 mm are possible, with a minimum thickness of the order of 0.1 mm (100 microns). Gaps between metal pieces of the order of 1 mm are also possible. With regard to the dimensions in the X-Y plane, it has been found that dimension(s) having effective lengths of at most one-tenth of a wavelength for the highest resonating operating frequency of the antenna element result in minimum degradation in antenna performance. Given that the metal pieces can have some nominal effect (i.e. some sort of modification) on the operating frequency of the antenna element (e.g. shift to a lower operating frequency), the "one-tenth of the wavelength rule" can be for the non-modified highest operating resonant frequency or for the modified highest operating frequency.

Dimensions outside of the above guidelines are possible, but an unacceptable reduction in antenna performance is likely in this case. In certain embodiments, a maximum five-tenths, $\frac{9}{20}$, four-tenths, $\frac{7}{20}$, three-tenths, $\frac{5}{20}$, two-tenths, $\frac{3}{20}$ of the wavelength may be appropriate.

It will be appreciated that the use of metal in housing can provide one or more of the following advantages:

Production of full metal housing;

Increase in strength of the apparatus;

Can be used as a decorative feature on the housing surface;

Can be used as a functional feature on the products, such as the use of metal on a sound port or button.

FIG. 4 shows some examples of pieces of metal which can be applied over an antenna element. In FIG. 4(*a*), there is shown a single large continuous piece of metal 110 substantially extending over an entire radiating face of the antenna element 301. FIG. 4(*b*) shows respective discrete continuous large pieces of metal 110 each over respective first and second adjacent antenna elements 405 and 410. FIG. 4(*c*) shows the embodiment of FIG. 4(*b*) but with a mosaic of small triangular metal pieces of metal 110 extending over radiating faces of the first and second adjacent antenna elements 405 and 410 (rather than the large pieces of FIG. 4(*b*). It has been found that so long as these pieces of metal 110 are isolated from each other, then the effect on the antenna performance is minimal. If beneficial, adjacent tiles can be electrically connected with narrow lines as illustrated in FIG. 4(*d*) for example.

However, in certain cases, it may be possible to (electrically e.g. using metal conductive elements) join one or more metal pieces without significantly negatively affecting the performance of the antenna element(s). One way of doing this is to use thin metallic tape on the antenna cover. A further way is to make the pieces of metal from metal sheet rather than tape.

It has been found that it is not required for the pieces of metal to be applied in a regular fashion, or for them to be all of the same shape. By varying the shape or patterning of the pieces of metal, aesthetically pleasing arrangements may be made. These could include features to protect vulnerable parts of the handset, such as corners or edges, or include logos for product branding.

The metal pieces could be made by chemical etching, or stamping and then moulded with a plastic backing (in-moulding or over moulding) to give a largely metal coverage. Alternatively, the metal could be soldered onto a plastic housing, in which the housing is a (double sided) PWB with the antenna on the inside. It would also be possible to attach individual pieces of metal by screws or riveting over the antenna area. By these means, the antenna area could be covered fully or partially in pieces of metal (i.e. metal tiles).

The housing could be made in a similar way to an MID (Moulded Interconnect Device), where metal plate-able plastic is over moulded with non-conductive plastic. The metal tiles can be soldered to the metal plated plastic. The tiles could be placed by a "panasert" pick and place electronic placing machine, and put through a reflow process. Alternatively, a decorative "badge" could be made by an electroforming or chemical etching method and adhesively attached to the cover.

The same method could be used to add metal details to the antenna cover for example, the pieces of metal could be shaped for example to form a rail detail across the cover (a continuous rail would ordinarily degrade the performance of the antenna).

It will be appreciated that embodiments of the invention can provide a housing comprising of solid metal pieces, which will be robust, and as the pieces may be arranged in a multitude of different patterns, aesthetically pleasing solutions will be possible.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A housing for an apparatus for portable wireless transmission, the apparatus for portable wireless transmission having an antenna element, the housing comprising:

a plurality of metal piece areas arranged to, when assembled with the apparatus for the portable wireless transmission, be located over the antenna element in a significant radiating direction in electrical isolation from an electrical ground of the apparatus, wherein the plurality of metal piece areas comprise a plurality of metal pieces arranged with the housing to be substantially electrically isolated from surrounding metal, with dimensions having effective lengths of at most about one-tenth of a wavelength for a highest resonating operating frequency of the antenna element, where the plurality of metal piece areas are located on the housing to be located in a significant radiating direction of the antenna element but allow the antenna element to radiate through the plurality of metal piece areas to provide the housing as a substantially radio transparent housing.

2. A housing according to claim 1, wherein the surrounding metal is other surrounding metal pieces of the housing.

3. A housing according to claim 1, wherein the surrounding metal is metal, which when the housing is assembled with the apparatus for portable wireless transmission, is adjacent the plurality of metal piece areas or metal pieces.

4. A housing according to claim 1, wherein the plurality of metal pieces are arranged to be touching other metal pieces to provide the dimensions for the touching metal having effective lengths of at most one-tenth of a wavelength for the highest resonating operating frequency of the antenna element.

5. A housing according to claim 1, wherein the antenna element has a single resonant operating frequency, and the highest operating resonant frequency is the single resonant operating frequency of the antenna element.

6. A housing according to claim 1, wherein the antenna element is a multi-band resonant antenna element, and the highest resonant operating frequency is the higher of the multiple resonant operating frequencies of the antenna element.

7. A housing according to claim 1, wherein a particular metal piece area is formed from a plurality of discrete metal pieces.

8. A housing according to claim 7, wherein the plurality of metal pieces are located proximal to one another with gaps at least about 0.1 mm.

9. A housing according to claim 1, wherein at least one of the plurality of metal pieces have a maximum thickness of up to about 2 mm in the radiating direction.

10. A housing according to claim 1, wherein at least one of the plurality of metal pieces has a dimension perpendicular to the radiating direction of the order of a few millimeters.

11. A housing according to claim 1, wherein at least one of the plurality of metal pieces are formed from metal having at least one of an irregular shape and a regular shape.

12. A housing according to claim 1, wherein at least one of the plurality of metal pieces are formed from metal having the shape of a symbol selected from the group consisting of an alphanumeric character and a graphical icon.

13. A housing according to claim 1, wherein at least one of the plurality of metal pieces comprise a precious metal.

14. A housing according to claim 1, wherein at least one of the plurality of metal pieces comprise a non-precious metal.

15. A housing according to claim 1, wherein at least one of the plurality of metal pieces comprise a metal alloy.

16. A housing according to claim 1, wherein the plurality of metal piece areas provide a matrix of substantially non-connected metal pieces.

17. A housing according to claim 1, wherein the housing provides an exterior housing for the apparatus.

18. A housing according to claim 1, wherein at least one of the plurality of the metal pieces are formed using at least one of chemical etching, electroforming, stamping, extruding, grinding, and polishing processes.

19. A housing according to claim 1, wherein the plurality of metal piece areas are formed on a substrate layer.

20. A housing according to claim 19, wherein the plurality of metal piece areas are with the housing to provide a layer on top of the substrate layer.

21. A housing according to claim 19, wherein the plurality of metal piece areas are with the housing to be substantially embedded within the substrate layer.

22. A housing according to claim 19, wherein at least one of the plurality of metal pieces are applied to the substrate by one of mechanical methods and chemical methods.

23. A housing according to claim 19, wherein the plurality of metal pieces are formed on the substrate layer during a moulding process to form the housing.

24. A housing according to claim 1, wherein the plurality of metal piece areas substantially extend over the entire face of the housing.

25. A housing according to claim 1, wherein the housing comprises a plurality of discrete metal piece areas each for a different antenna element.

26. A housing according to claim 1, wherein the metal piece area is formed to extend over at least one of a corner region, a side region and an edge region of the housing.

27. An apparatus for portable wireless transmission comprising:

an antenna element arranged to resonate at a particular highest resonant operating frequency to send/receive transmissions substantially in a significant radiating direction, and a housing comprising:

a plurality of metal piece areas arranged to, when assembled with the apparatus for the portable wireless transmission, be located over the antenna element in a significant radiating direction in electrical isolation from an electrical ground of the apparatus, wherein the plurality of metal piece areas comprise a plurality of metal pieces arranged with the housing to be substantially electrically isolated from surrounding metal, with dimensions having effective lengths of at most about one-tenth of a wavelength for the highest resonating operating frequency of the antenna element, where the plurality of metal piece areas are in a significant radiating direction of the antenna element but allow the antenna element to radiate through the plurality of metal piece areas to provide the housing as a substantially radio transparent housing.

28. An apparatus according to claim 27 where the antenna element and plurality of metal piece areas are configured to provide a predetermined antenna tuning.

29. An apparatus according to claim 27 where the plurality of metal piece areas is located relative to the antenna element to shift operating frequency of the portable wireless transmission to a lower operating frequency.

30. A method of comprising:

forming a housing for an apparatus for portable wireless transmission, the apparatus for portable wireless transmission having an antenna element arranged to resonate at a particular highest resonant operating frequency to send/receive transmissions substantially in a significant radiating direction, the housing comprising:

a plurality of metal piece areas arranged to, when assembled with the apparatus for the portable wireless transmission, be located over the antenna element in a significant radiating direction in electrical isolation from an electrical ground of the apparatus, wherein the plurality of metal piece areas comprise a plurality of metal pieces arranged with the housing to be substantially electrically isolated from surrounding metal with dimensions having effective lengths of at most about one-tenth of a wavelength for the highest resonating operating frequency of the antenna element, where the plurality of metal piece areas are in a significant radiating direction of the antenna element but allow the antenna element to radiate through the plurality of metal piece areas to provide the housing as a substantially radio transparent housing.

31. A method as in claim 30 further comprising providing the antenna element and plurality of metal piece areas with a configuration for a predetermined antenna tuning.

32. A method as in claim 30 where the plurality of metal piece areas is located to shift operating frequency of the portable wireless transmission to a lower operating frequency.

33. A means for housing for a means for portable wireless transmission, the means for portable wireless transmission having a means for resonating arranged to resonate at a particular highest resonant operating frequency to send/receive transmissions substantially in a significant radiating direction, the means for housing comprising:

a plurality of metal piece areas arranged to, when assembled with the means for portable wireless transmission, be located over the means for radiating in a significant resonating direction in electrical isolation from an electrical ground, of the means for portable wireless transmission, wherein the plurality of metal piece areas comprise a plurality of metal pieces arranged with the means for housing to be substantially electrically isolated from surrounding metal with dimensions having effective lengths of at most one-tenth of the wavelength for the highest resonating operating frequency of the means for resonating, where the plurality of metal piece areas are in a significant radiating direction of the means for resonating but allow the means for resonating to radiate through the plurality of metal piece areas to provide the means for housing as a substantially radio transparent housing.

34. An apparatus comprising: a means for portable wireless transmission, the means for portable wireless transmission having a means for radiating arranged to resonate at a particular highest resonant operating frequency to send/receive transmissions substantially in a significant radiating direction, and a means for housing the means for portable wireless transmission, the means for housing comprising:

a plurality of metal piece areas arranged to, when assembled with the means for portable wireless transmission, be located over the means for radiating in a significant radiating direction in electrical isolation from an electrical ground of the means for portable wireless transmission, wherein the plurality of metal piece areas comprise a plurality of metal pieces arranged with the means for housing to be substantially electrically isolated from surrounding metal with dimensions having effective lengths of at most one-tenth of a wavelength for the highest resonating operating frequency of the means for radiating, where the plurality of metal piece areas are in the significant radiating direction of the means for radiating but allow the means for radiating to radiate through the plurality of metal piece areas to provide the means for housing as a substantially radio transparent housing.

* * * * *